(12) United States Patent
Chatterjea et al.

(10) Patent No.: US 12,100,137 B2
(45) Date of Patent: Sep. 24, 2024

(54) SYSTEM FOR ANALYSIS OF MICROSCOPIC DATA USING GRAPHS

(71) Applicant: KONINKLIJKE PHILIPS N.V., Eindhoven (NL)

(72) Inventors: Supriyo Chatterjea, Eindhoven (NL); Johannes Henricus Maria Korst, Eindhoven (NL); Marinus Bastiaan Van Leeuwen, Eindhoven (NL); Reinhold Wimberger-Friedl, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 701 days.

(21) Appl. No.: 17/267,821

(22) PCT Filed: Aug. 13, 2019

(86) PCT No.: PCT/EP2019/071756
§ 371 (c)(1),
(2) Date: Feb. 11, 2021

(87) PCT Pub. No.: WO2020/035508
PCT Pub. Date: Feb. 20, 2020

(65) Prior Publication Data
US 2021/0166387 A1    Jun. 3, 2021

(30) Foreign Application Priority Data
Aug. 15, 2018    (EP) .................................... 18189088

(51) Int. Cl.
*G06F 18/2413*    (2023.01)
*G06T 7/00*    (2017.01)

(52) U.S. Cl.
CPC ........ *G06T 7/0012* (2013.01); *G06F 18/2414* (2023.01); *G06T 2207/20072* (2013.01); *G06T 2207/30024* (2013.01)

(58) Field of Classification Search
CPC ....... G06F 18/2414; G06T 2207/20072; G06T 2207/20084; G06T 2207/30024; G06T 7/0012
See application file for complete search history.

(56) References Cited

U.S. PATENT DOCUMENTS 6,424,348 B2 *   7/2002   Parikh ..................... G06T 15/04
                                                           345/503
9,224,106 B2 *   12/2015   Cosatto ............. G06V 30/2504
(Continued)

FOREIGN PATENT DOCUMENTS

WO      WO2013019856 A1      2/2013

OTHER PUBLICATIONS

PCT International Search Report, International application No. PCT/EP2019/071756,Sep. 18, 2019.
(Continued)

*Primary Examiner* — Tsung Yin Tsai
(74) *Attorney, Agent, or Firm* — Sherry Austin

(57) ABSTRACT

Disclosed is a system for analysis of microscopic image data acquired from biological cells. The system includes a data processing system which is configured to read the image data and determine a plurality of vertices, wherein each of the vertices represents a location of an entity of interest within a region of interest of the image data. The data processing system generates a plurality of graphs, wherein for each of the graphs, the generation of the respective graph includes generating a plurality of edges, wherein each of the edges has two of the plurality of vertices associated therewith. For each of the graphs one or more vertex sets are
(Continued)

identified, each of which consisting of one or more of the plurality of vertices. The data processing system further determines, for each of the graphs, a number of the identified vertex sets.

11 Claims, 8 Drawing Sheets

(56) References Cited

U.S. PATENT DOCUMENTS

| | | | |
|---|---|---|---|
| 10,121,245 B2* | 11/2018 | Chen | G06V 20/698 |
| 10,445,619 B2* | 10/2019 | Barnes | G06F 18/214 |
| 10,783,627 B2* | 9/2020 | Madabhushi | G06T 7/0012 |
| 2002/0196964 A1* | 12/2002 | Stone | A61B 5/0059 382/128 |
| 2003/0224344 A1* | 12/2003 | Shamir | G16B 25/10 702/19 |
| 2006/0036337 A1 | 2/2006 | Yener | |
| 2006/0036372 A1* | 2/2006 | Yener | G06V 20/695 703/11 |
| 2010/0098306 A1 | 4/2010 | Madabhushi | |
| 2013/0328922 A1* | 12/2013 | Belanger | G06T 11/60 345/629 |
| 2014/0180977 A1* | 6/2014 | Cosatto | G06N 20/00 706/12 |
| 2015/0254494 A1 | 9/2015 | Madabhushi | |
| 2017/0076448 A1* | 3/2017 | Chen | G06T 7/12 |
| 2017/0091527 A1 | 3/2017 | Sarachan | |
| 2017/0140246 A1* | 5/2017 | Barnes | G06F 18/285 |
| 2018/0253841 A1* | 9/2018 | Madabhushi | G06T 7/162 |
| 2020/0018615 A1* | 1/2020 | Ogawa | G01C 21/3676 |
| 2021/0151168 A1* | 5/2021 | Bremer | G16H 30/40 |
| 2021/0166387 A1* | 6/2021 | Chatterjea | G06T 7/0012 |

OTHER PUBLICATIONS

Galon J. et al., "Towards the Introduction of the 'Immunoscore' in the Classification of Malignant Tumors", Journal of Apthology, 232(2):199-209, 2014.

Heindl A. et al., "Mapping Spatial Heterogeneity in the Tumor Environment: a New Era for Digital Pathology", Laboratory Investigation 95: 377-384, 2015.

Nawas S. A. et al., "Beyond Immune Density: Critical Role of Spatial Heterogeneity in Estrogen Receptor-Negative Breast Cancer", Modern Pathology 28(6):766-777, 2015.

Hendry S. et al., "Assessing Tumor-Infiltrating Lymphocytes in Solid Tumors: a Practical Review for Pathologists and Proposal for a Standardized Method from the International Immuno-Oncology Biomarkers Working Group", Part 2: TILs in Melanoma, Gastrointestinal Tract Carcinomas, Non-Small Cell Lung Carcinoma and Mesothelioma, Endometrial and Ovarian Carcinomas, Squamous Cell Carcinoma of the Head and Neck, Genitourinary Carcinomas, and Primary Brain Tumors, Adv Anat Pathol. (2017), 24(6): 311-335.

Wang C. et al., "Identifying Survival Associated Morphological Features of Triple Negative Breast Cancer Using Multiple Datasets", Journal of the American Medical Informatics Association: JAMIA, Jul.-Aug. 2013;20(4):680-687.

Vyas S.J. et al., "Radiological Tumor Density and Lymph Node Size Correlate with Survival in Resectable Adenocarcinoma of the Pancreatic Head: a Retrospective Cohort Study", Journal of the Cancer Research and Therapeutics, 2016, vol. 12, issue 1, pp. 417-421.

"Unit Disk Graph", Wikipedia, Downloaded from the Internet, Feb. 10, 2021, https://en.wikipedia.org/wiki/Unit_disk_graph.

Component (Graph Theory), Wikipedia, Downloaded from the Internet, Feb. 10, 2021, https://en.wikipedia.org/wiki/Connected_component_(graph_theory).

Sharma Harshita et al: "Cell Nuclei Attributed Relational Graphs for Efficient Representation and Classification of Gastric Cancer in Digital Histopathology", Progress in Biomedical Optics and Imaging, SPIE—International Society for Optical Engineering, Bellingham, WA, US, vol. 9791, Mar. 23, 2016 (Mar. 23, 2016), pp. 97910X-97910X, XP060070725.

Noorelaiza Abdul Khalid et al: "Abnormal Gastric Cell Segmentation Based on Shape Using Morphological Operations", Jun. 18, 2012 (Jun. 18, 2012), Computational Science and Its Applications ICCSA 2012, Springer Berlin Heidelberg, Berlin, Heidelberg, pp. 728-738, XP047007361.

Cheikh B.B. et al., "Graph-Based Approach for Spatial Heterogeneity Analysis in Tumor Micro-Environment", 13th European Congress on Digital Pathology Proceedings, Diagnostic Pathology 2016, 8:228.

Rodenacker K. et al., "Quantification of Tissue Sections: Graph Theory and Topology as Modelling Tools", Pattern Recognition Letters, pp. 274-284, Apr. 1990.

Chadhuri B.B. et al., "Characterization and Featuring of Histological Section Images", Pattern Recognition Letters, pp. 245-252, Apr. 1988.

Bilgin C. et al., "Cell-Graph Mining for Breast Tissue Modeling and Classification", Engineering in Medicine and Biology Society, 2007. EMBS 2007. 29th Annual International Conference of the IEEE Aug. 2007.

* cited by examiner

SYSTEM FOR ANALYSIS OF MICROSCOPIC DATA USING GRAPHS

CROSS-REFERENCE TO RELATED APPLICATIONS

This patent application claims the priority benefit under 35 U.S.C. § 371 of International Patent Application no. PCT/EP2019/071756, filed Aug. 13, 2019, which claims the benefit of European Patent Application No. EP18189088.0, filed on Aug. 15, 2018. These applications are hereby incorporated by reference herein in their entirety.

FIELD OF THE INVENTION

The present invention relates to computational analysis of microscopic image data acquired from biological cells.

BACKGROUND OF THE INVENTION

Tissue pathology is a cornerstone in cancer diagnosis and prognosis. In conventional techniques of cancer diagnosis and prognosis, pathologists visually review stained slides of cancer biopsy samples and assign scores to the detected tumors. This process, however, is time-consuming and the results are often inconsistent across pathologists.

Computer-assisted quantitative analysis of stained histology images have been made particularly efficient through whole slide scanners which allow acquisition of high resolution digital scans of entire microscopic slides. Such scanners can rapidly generate ultra-large 2D images of a whole tissue sample for digitization of histological slides. Automatic image processing procedures can then be applied to extract structures of interest from the original image for use in diagnosis or prognosis. This area has become widely known as digital pathology and replaces manual subjective and time-consuming scoring of data by traditional pathologist assessment. The image processing procedures can automatically detect cells and tissue types and have become very powerful with the aid of deep convolutional neural network technology. Similar problems occur in the assessment of cytological images.

There is, however, still a need to extract one or more parameters from microscopic images which are acquired from cells so that the parameters allow efficient and reliable image analysis.

SUMMARY OF THE INVENTION

Embodiments provide a system for analysis of microscopic image data acquired from biological cells. The system comprises a data processing system which is configured to read the image data and to determine a plurality of vertices, wherein each of the vertices represents a location of an entity of interest within a region of interest of the image data. The data processing system is further configured to generate a graph, wherein the generating of the graph comprises generating a plurality of edges, wherein each of the edges has two of the plurality of vertices associated therewith. The data processing system is further configured to identify, depending on the edges generated for the graph, a plurality of vertex sets, each of which consisting of one or more of the plurality of vertices. The data processing system is further configured to determine a number of the identified vertex sets.

The term "graph" may be defined as in graph theory. Specifically, a graph may be defined as consisting of a set of vertices (also denoted as nodes) and a set of edges. Each edge has two vertices associated with it, called its endpoints. An edge is said to connect its endpoints.

The data analysis system may include a computer system having a processor and a memory for storing instructions processable by the processor. The processor may execute an operating system. The data analysis system may further include a user interface configured to allow a user to receive data from the data processing system and/or to provide data to the data processing system. The user interface may include a graphical user interface.

The data processing system may include a display device and may be configured to display to the user the region of interest and/or one or more graphical representations determined depending on the graph, depending on one or more of the vertex sets and/or depending on the number of identified vertex sets. By way of example, the graphical representation may be a heat map or may show the graph, the vertex sets and/or the number of identified vertex sets. The graphical representation and at least a portion of the image data may be concurrently displayed on the display. The graphical representation may be displayed overlaid with at least a portion of the image data. The data processing system may be configured to receive user input for selecting the region of interest displayed to the user. By way of example, the user input for selecting the region of interest may be indicative of a zoom level and/or a position of the region of interest relative to the image region represented by the microscopic image data. The data processing system may further be configured to update, depending on the received user input for selecting the field of view, the graphical representation displayed to the user.

Additionally or alternatively, the system may include an image acquisition unit for acquiring the image data. The image acquisition unit may be configured as a microscope. The microscope may be operable at a magnification of at least 5 or at least 10. The magnification may be less than 500 or less than 200. The microscope may be a scanner, in particular a microscope slide scanner. The microscope may be configured for transmission and/or reflectance imaging. The image is acquired from a tissue sample. The tissue sample may be obtained from a human or animal body region. The image data may include greyscale image data and/or color image data. The image data may show biological cells and/or tissue portions. The microscopic image data may have a resolution sufficient to determine the position and/or the shape of a cell nucleus having a diameter of 5 micrometers. The microscopic image data may have a resolution better than 5 micrometers or better than 3 micrometers or better than 2 micrometers. The tissue sample may be a tissue slice. The biological cells may include tumor cells and/or immune cells.

The vertices may be determined using at least a portion of the image data. Each of the vertices may represent a point in the image. The determination of the vertices may include identifying one or more entities of interest in the image data. By way of example, an entity of interest may be a cell, a cell nucleus, a cell cluster or a tissue portion. The determination of the vertices may further include assigning each of the entities of interest to one of a plurality of predefined classes of entities of interest. Classes of entities of interest may be but are not limited to one or a combination of: immune cells (or immune cell nuclei or immune cell clusters), tumor cells (or tumor cell nuclei or tumor cell clusters), stromal cells (or stromal cell nuclei or stromal cell clusters), tumor tissue, healthy tissue (i.e. non-tumor tissue), epithelial tissue, endothelial tissue and stromal tissue.

The region of interest may be at least a portion of the image region represented by the microscopic image data.

The determination of the vertices and/or the entities of interest may be performed automatically or interactively, i.e. using user input received via the user interface. The user input may be received via a graphical user interface. By way of example, the determination of the vertices and/or entities of interest may include image processing operations, such as edge detection and/or segmentation applied to at least a portion of the image data. Additionally or alternatively, the determination of the vertices and/or entities of interest may be performed using a neural network, in particular a convolutional neural network and/or statistical data analysis, such as cluster analysis.

The generation of the edges of the graph may be performed depending on at least a portion of the generated vertices, in particular depending on a position of at least a portion of the vertices. The graph may be an undirected graph. However, it is also conceivable that the graph is a directed graph.

The generation of the edges of the graph may be performed interactively (i.e. requiring user intervention via the user interface). The data processing system may be configured to present to the user, using a display device of the data processing system, at least a portion of the region of interest and/or a graphical representation which is determined using the graph, the vertex sets and/or the number of the identified vertex sets. At least a portion of the graphical representations may be overlaid on the displayed portion of the region of interest. The data processing system may be configured to receive user input indicative of one or more parameters which are used by the data processing system to determine the plurality of vertices, to generate the edges of the graph and/or to identify the vertex sets. By way of example, the data processing system may receive user input indicative of a threshold value. The data processing system may determine, for one or more pairs of the vertices, whether or not to generate an edge which is associated with the pair of vertices, depending on the threshold value.

One or more vertex sets are identified for the graph. By way of example, each of the vertex sets may represent a connected component of the graph, i.e. an isolated subgraph. However, it is also conceivable that additional or alternative criterions are applied for identifying the vertex sets.

A number of the determined vertex sets or connected components is determined. The determined number may range between one and the number of vertices, which have been determined depending on the image data.

According to an embodiment, the data processing system is further configured to classify and/or to rate one or more of the entities of interest and/or the region of interest depending on the determined number of generated vertex sets. The data processing system may be configured to classify and/or rate at least one tissue portion contained in the region of interest and/or to rate at least one cell contained in the region of interest. The classes for the classification may include but are not limited to one or a combination of: immune cells (or immune cell nuclei or immune cell clusters), tumor cells (or tumor cell nuclei or tumor cell clusters), stromal cells (or stromal cell nuclei or stromal cell clusters), tumor tissue, healthy tissue (i.e. non-tumor tissue), epithelial tissue, endothelial tissue and stromal tissue. The rating may include determining a probability. The probability may be a probability that the region of interest and/or one or more of the entities of interest represents abnormal tissue/cells, such as cancerous tissue/cells, rather than normal tissue/cells. The rating may include a tumor grading. A tumor grade may be defined as a description of a tumor based on how abnormal the tumor cells and/or the tumor tissue are. The data processing system may be configured to generate, depending on the classification and/or depending on the rating, a graphical representation. By way of example, the graphical representation is a heat map. The graphical representation may be displayed by the data processing system on a display device. The graphical representation may be displayed concurrently and/or in an overlaid fashion with at least a portion of the image data.

According to a further embodiment a) each of the identified vertex sets consists of vertices so that each pair thereof is connected by one or more of the generated edges; and b) the identified vertex sets are mutually unconnected by the edges of the graph. The above-mentioned conditions a) and b) may represent a definition for connected components of a graph so that each of the identified vertex sets may represent an isolated subgraph.

According to a further embodiment, the generation of the graph comprises determining for a pair of the vertices whether or not to generate an edge associated with the pair depending on a value of a distance between the vertices of the pair according to a predefined metric. The predefined metric may be the Euclidean metric. The determination whether or not to generate an edge may be made for each pair of the vertices.

According to a further embodiment, the determining whether or not to generate an edge comprises comparing the value of the distance with a predefined threshold. By way of example, an edge is generated if the value of distance is equal to or shorter than the predetermined threshold and no edge is generated if the value of the distance exceeds the predetermined threshold.

According to a further embodiment, the data processing system is further configured to generate a plurality of graphs. For each of the graphs, the generation of the respective graph may comprise generating a plurality of edges, wherein each of the edges has two of the plurality of vertices associated therewith. The data processing system may further be configured to identify, for each of the graphs and depending on the edges generated for the respective graph, one or more vertex sets, each of which consisting of one or more of the plurality of vertices. The data processing system may further be configured to generate, for each of the graphs, a number of the identified vertex sets.

According to a further embodiment, the data processing system is configured to determine a sum of the determined numbers of identified vertex sets over all or over a portion of the generated graphs. Additionally or alternatively, the data processing system is configured to determine a difference between two of the determined numbers of identified vertex sets of different graphs.

According to a further embodiment, for each of the graphs, the generation of the respective graph comprises: determining for a pair of the vertices whether or not to generate an edge associated with the pair depending on whether or not a distance between the vertices of the pair according to a predefined metric is smaller than a threshold which is predefined for the respective graph. The predefined metric may be the Euclidean metric. The predefined thresholds for generating the graphs may be different from each other.

According to a further embodiment, the generation of the graph comprises generating a unit disk graph depending on at least a portion of the vertices. A unit disk graph may be defined as a graph formed from a collection of vertices in the Euclidean plane, in which two vertices are connected if their distance is below a fixed threshold.

According to a further embodiment, the generation of the graph comprises generating a Voronoi diagram depending on at least a portion of the vertices.

According to a further embodiment, the determining of the vertices includes determining the vertices so that a) each of the vertices corresponds to an immune cell, in particular to a nucleus of an immune cell contained in the region of interest; or b) each of the vertices corresponds to a tumor cell, in particular to a nucleus of a tumor cell contained in the region of interest.

According to a further embodiment, the edges are determined so that each of the edges is associated with a pair of different predefined cell types. By way of example, the predefined cell types may include tumor cells and immune cells.

According to a further embodiment, each of the vertices represents a cell or cell nucleus contained in the region of interest.

According to a further embodiment, the data processing system is further configured to determine a number of vertex sets for each of a plurality of regions of interest of the tissue sample. The data processing system may further be configured to generate a map of the plurality of regions of interest depending on the determined numbers of vertex sets of the plurality of regions of interest.

According to a further embodiment, the system comprises an image acquisition unit which is configured to receive a sample, which comprises the biological cells. The sample may be placed on a microscope slide and the image acquisition unit may be configured to receive the microscope slide. The image acquisition unit may be configured to image the biological cells. The image acquisition unit may be configured to acquire image data from the biological cells. The image data may be the microscopic image data. Alternatively, the microscopic image data may be generated using the image data acquired by the image acquisition unit, for example by using the image processing system.

Embodiments provide a method of analyzing microscopic image data acquired from biological cells. The analysis is performed using a data processing system. The method comprises reading, using the data processing system, the image data. The method further comprises determining, using the data processing system, a plurality of vertices, wherein each of the vertices represents a location of an entity of interest within a region of interest of the image data. The method further comprises generating, using the data processing system, a graph, wherein the generating of the graph comprises generating a plurality of edges. Each of the edges has two of the plurality of vertices associated therewith. The method further comprises identifying, using the data processing system and depending on the edges generated for the graph, a plurality of vertex sets, each of which consisting of one or more of the plurality of vertices. The method further comprises determining, using the data processing system, a number of the identified vertex sets.

Embodiments provide a program element for analyzing microscopic image data acquired from biological cells. The analysis is performed using a data processing system. The program element, when being executed by a processor of the data processing system, is adapted to carry out: reading the image data and determining a plurality of vertices, wherein each of the vertices represents a location of an entity of interest within a region of interest of the image data. The program element is further configured to carry out generating a graph, wherein the generating of the graph comprises generating a plurality of edges. Each of the edges has two of the plurality of vertices associated therewith. The program element is further configured to carry out identifying, depending on the edges generated for the graph, a plurality of vertex sets, each of which consisting of one or more of the plurality of vertices. The program element is further configured to carry out determining a number of the identified vertex sets.

Embodiments provide a computer readable medium having stored thereon the computer program element as described in the previous paragraph.

The present disclosure relates to the following embodiments:

Item 1: A system for analysis of microscopic image data acquired from biological cells, the system comprising a data processing system which is configured to: read the image data; determine a plurality of vertices, wherein each of the vertices represents a location of an entity of interest within a region of interest of the image data; generate a graph, wherein the generating of the graph comprises generating a plurality of edges, wherein each of the edges has two of the plurality of vertices associated therewith; identify, depending on the edges generated for the graph, a plurality of vertex sets, each of which consisting of one or more of the plurality of vertices; and to determine a number of the identified vertex sets.

Item 2: The system of item 1, wherein the data processing system is further configured to classify and/or to rate at least one tissue portion contained in the region of interest, a cell contained in the region of interest, a group of cells contained in the region of interest and/or the region of interest depending on the determined number of generated vertex sets.

Item 3: The system of items 1 or 2, wherein: a) each of the identified vertex sets consists of one vertex or more vertices so that each pair thereof is connected by one or more of the edges of the graph; and b) the identified vertex sets are mutually unconnected by the edges of the graph.

Item 4: The system of any one of the preceding items, wherein the generation of the graph comprises determining for a pair of the vertices whether or not to generate an edge associated with the pair depending on a value of a distance between the vertices of the pair according to a predefined metric.

Item 5: The system of any one of items 1 to 4, wherein the data processing system is further configured to: generate a plurality of graphs, wherein for each of the graphs, the generation of the respective graph comprises generating a plurality of edges, wherein each of the edges has two of the plurality of vertices associated therewith; identify, for each of the graphs and depending on the edges generated for the respective graph, one or more vertex sets, each of which consisting of one or more of the plurality of vertices; and to generate, for each of the graphs, a number of the identified vertex sets.

Item 6: The system of item 5, wherein the data processing system is further configured to determine: a sum of the determined numbers of identified vertex sets over all or over a portion of the generated graphs; and/or a difference between two of the determined numbers of identified vertex sets of different graphs.

Item 7: The system of item 5 or 6, wherein for each of the graphs, the generating of the respective graph comprises: determining for a pair of the vertices whether or not to generate an edge associated with the pair depending on whether or not a distance between the vertices of the pair according to a predefined metric is smaller than a threshold which is predefined for the respective graph; wherein the predefined thresholds of the graphs are different from each other.

Item 8: The system of any one of the preceding items, wherein the data processing system comprises a display device and is further configured to display to the user one or more graphical representations determined depending on the graph (1, 33), depending on one or more of the vertex sets and/or depending on the number of the identified vertex sets.

Item 9: The system of any one of the preceding items, wherein the generation of the graph comprises: generating a unit disk graph depending on at least a portion of the vertices; and/or generating a Voronoi diagram depending on at least a portion of the vertices.

Item 10: The system of any one of the preceding items, wherein the determining of the vertices includes determining the vertices so that a) each of the vertices corresponds to an immune cell contained in the region of interest; or b) each of the vertices corresponds to a tumor cell contained in the region of interest.

Item 11: The system of any one of the preceding items, wherein: the edges are determined so that each of the edges is associated with a pair of different predefined cell types; and/or each of the vertices represents a cell nucleus contained in the region of interest.

Item 12: The system of any one of the preceding items, wherein the system comprises an image acquisition unit which is configured to: receive a sample, which comprises the cells; and to image the cells.

Item 13: A method of analyzing microscopic data acquired from biological cells, wherein the analysis is performed using a data processing system, the method comprising: reading, using the data processing system, the image data; determining, using the data processing system, a plurality of vertices, wherein each of the vertices represents a location of an entity of interest within a region of interest of the image data; generating, using the data processing system, a graph, wherein the generating of the graph comprises generating a plurality of edges, wherein each of the edges has two of the plurality of vertices associated therewith; identifying, using the data processing system, depending on the edges generated for the graph, a plurality of vertex sets, each of which consisting of one or more of the plurality of vertices; and determining, using the data processing system, a number of the identified vertex sets.

Item 14: A program element for analyzing microscopic data acquired from biological cells, wherein the analysis is performed using a data processing system, wherein the program element, when being executed by a processor of the data processing system, is adapted to carry out: reading the image data; determining a plurality of vertices, wherein each of the vertices represents a location of an entity of interest within a region of interest of the image data; generating a graph, wherein the generating of the graph comprises generating a plurality of edges, wherein each of the edges has two of the plurality of vertices associated therewith; identifying depending on the edges generated for the graph, a plurality of vertex sets, each of which consisting of one or more of the plurality of vertices; and determining a number of the identified vertex sets.

Item 15: A computer readable medium having stored thereon the computer program element of item 14.

DETAILED DESCRIPTION OF EMBODIMENTS

Figure 6:
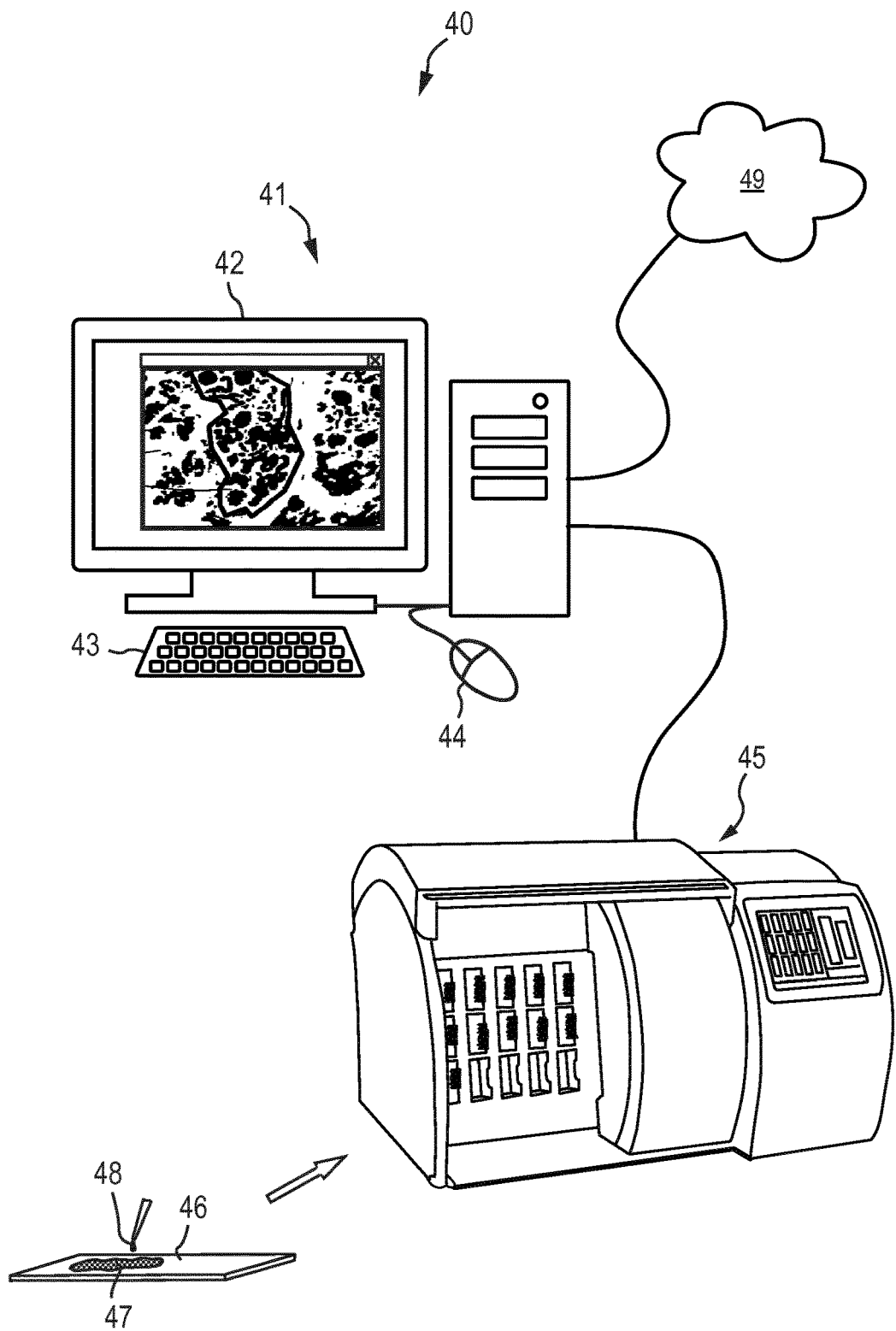
FIG. 6 is a schematic illustration of a system for analysis of microscopic image data acquired from biological cells according to an exemplary embodiment.

FIG. 6 schematically illustrates a system 40 for analysis of microscopic image data acquired from biological cells according to an exemplary embodiment. The system 40 includes a data processing system 41 which may be configured as a stand-alone computer. However, it is also conceivable that the data processing system 41 is configured as a distributed computer system which is implemented using a computer network 49, such as the Internet or a local area network (LAN).

The data processing system 41 includes a display device 42, and input devices, such as a keyboard 43 and a computer mouse 44 allowing user interaction via a graphical user interface of the data processing system 41.

The data processing system 41 is configured to read microscopic image data generated using an image acquisition unit 45. In the exemplary embodiment, the image acquisition unit 45 is a microscope slide scanner, such as a whole slide scanner, which is configured to acquire an image of biological cells which are placed on a microscope slide 46. It is to be understood that the invention is not limited to slide scanners. It is conceivable that other kinds of microscopes are used for acquiring image data from the biological cells. It is further conceivable that other image acquisition techniques than microscopy are used. By way of example, non-microscopic image data may be generated by the image acquisition unit and transformed into the microscopic image data using a computer algorithm, which may be implemented in the data processing system 41. The microscopic image data may include greyscale image data and/or color image data.

The object 47 includes biological cells and may be a tissue sample taken from biopsy or resection material so that the system 40 is used for inspection of histopathological images. However, it is also conceivable that the object 47 is a smear such as a Pap smear which is prepared on the microscope slide 46. As further illustrated in FIG. 6, before the image is acquired, the object 47 is stained using a stain 48.

Figure 1A:
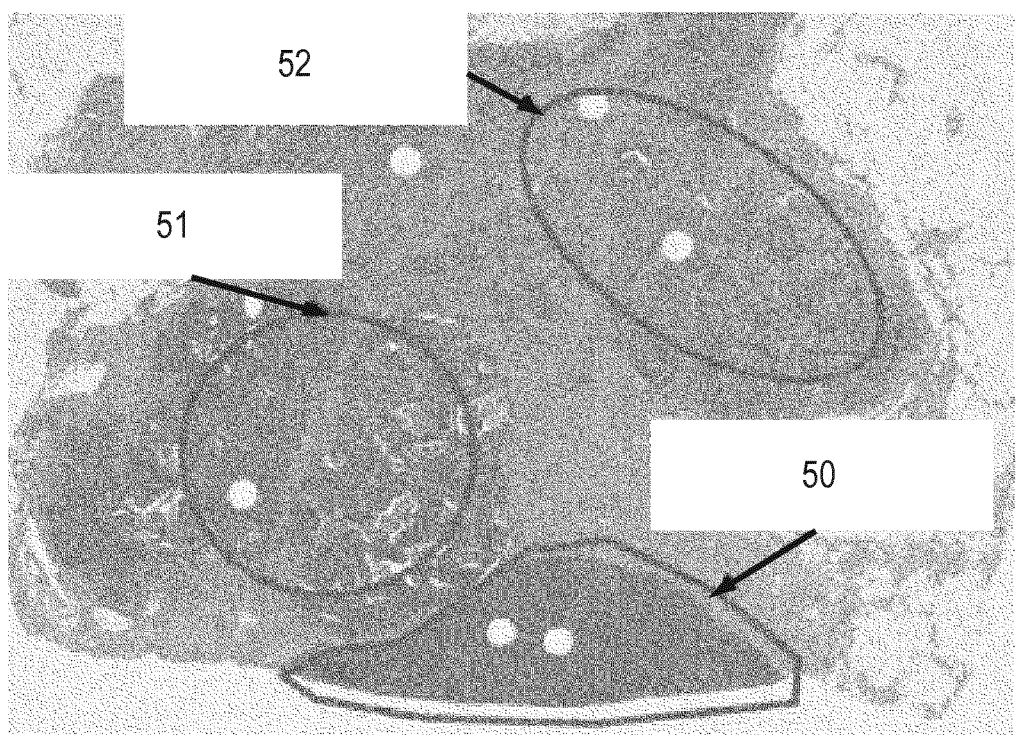
FIG. 1A is a micrograph of a H&E stained portion of breast tissue indicative of a density distribution of biological cells.

FIG. 1A is an image of a breast tissue sample, which has been acquired using the image acquisition unit 45 (shown in FIG. 6). The image shown in FIG. 1A is a portion of a whole slide image showing a region of interest representing a tumor microenvironment. As mentioned before, the tissue sample was stained before acquiring the image data. For acquiring the image of FIG. 1, H&E stain was used to allow discrimination between cells with different morphological appearance. Additionally or alternatively, it is also conceivable that immunohistochemical staining is used to allow subtyping of cells with a similar appearance.

FIG. 1A reveals a non-homogeneous density distribution of tumor cells over the region of interest having a first region 50 of a high tumor cell density, a second region 51 of a medium level tumor cell density and a third region 52 of a low tumor cell density. Since the tumor micro-environment includes regions of widely different cell density levels, determining the density of cells averaged over the entire region of interest results in a loss of valuable information and therefore does not yield a characterization of the tumor micro-environment with a sufficiently high predictive value. This is further discussed below in connection with density distributions of immune cells shown in FIGS. 1B and 1C.

It has been shown that tumor tissue is not only composed of tumor cells but contains a variety of cells which either are recruited by the tumor cells to enable tumor growth or which are recruited by the immune response of the host to deal with the abnormal situation. It has been shown that the spatial context within the tumor-microenvironment represented by immune cells has a significant influence on cancer development. Therefore, the immune system's response is of high importance for prognosis and for predicting responses to the new classes of cancer therapies, such as checkpoint blockade immunotherapy and other immunotherapies.

Figure 1B:
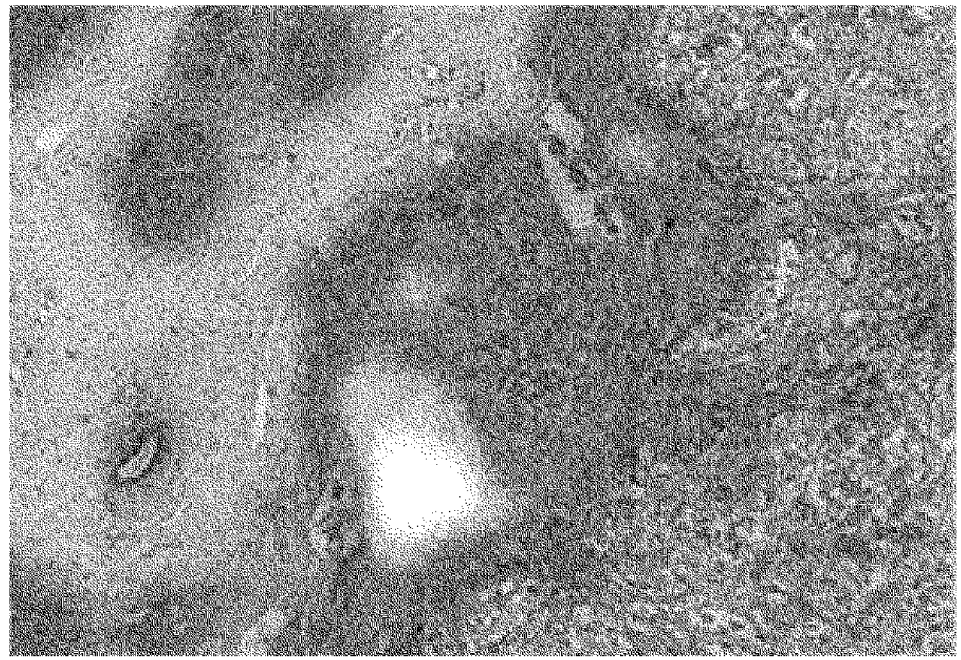
FIGS. 1B and 1C show heat maps of tissue portions of different region of interests, wherein the heat maps are indicative of the density distribution of immune cells within the respective region if interest.

FIG. 1B illustrates image data which have been acquired from a tissue slice and which represents a heat map illustrating the density distribution of immune cells over a region of interest. The heat map shows localized "hot spots" (i.e. areas of substantially white color in FIG. 1B) indicating areas where a high density of tumor infiltrating lymphocytes (TILs) exist.

Figure 1C:
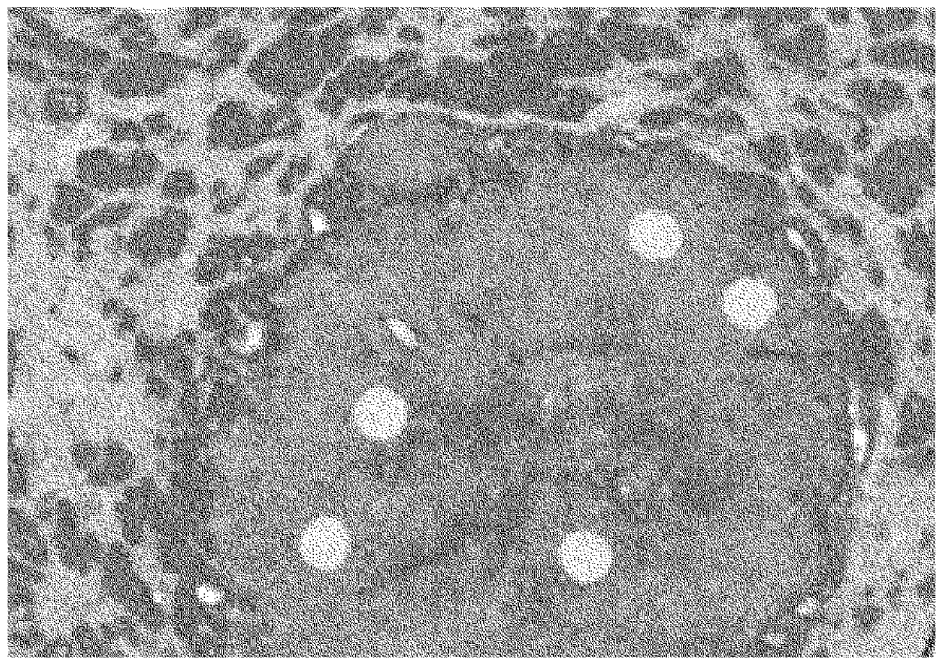

FIG. 1C illustrates further image data which have been acquired from the same tissue slice as the image data shown in FIG. 1B, but from a different region of interest. The image data of FIG. 1C represent, in the same way as the image data of FIG. 1B, a heat map illustrating the density distribution of immune cells over the second region of interest.

As can be seen by comparing FIGS. 1B and 1C, the density distributions of immune cells in the first and second regions of interest are significantly different. However, it has been shown that the heat map by itself is less useful for pathologically evaluating the differences between the microenvironments of the regions of interest of FIGS. 1B and 1C.

In view of this, the inventors have found that it is possible to evaluate the tumor-microenvironment to determine one or more parameter values which allow efficient and reliable diagnosis and prognosis. The parameter values may represent a score for the tumor-microenvironment and/or may be used to compare different tumor microenvironments, i.e. different regions of interest. By way of example, the determined parameter values may relate to the spatial arrangement of the tumor cells and/or immune cells and/or to the embedding of the tumor cells into stromal tissue. This is explained in detail below in connection with FIGS. 5A and 5B.

The determined parameter values may therefore be used to provide the pathologist with various types of information. By way of example, the determined parameter values may be used to perform a quantitative analysis of histopathological features of the cancer or could even help to estimate survival rates of patients.

Specifically, the determined parameter values may be used to characterize the spatial context of a tumor within the micro-environment provided by immune cells. This spatial context has been found to be critical for cancer development. By way of example, in various types of cancer, the abundance and spatial locations of tumor-infiltrating lymphocytes has been associated with a favorable prognosis. Further, it has been shown that spatial patterns of tumor-infiltrating lymphocytes are linked to specific growth patterns at the margins of the tumor.

By way of example, one or more parameter values may be determined which are indicative of a degree of clustering of cell or one or more selected cell types or indicative of a degree of fragmentation of tissue or one or more selected tissue types within the region of interest. Example for cells types are tumor cells, immune cells and stroma cells. Example for tissue types may be tumor tissue, normal tissue and stromal tissue.

It has been shown that the determined parameter values allow characterization of density distributions of entities of interest, such as cells or tissue portions, in a quantitative manner, thereby allowing a comparison of density distributions of different regions of interest. The density distributions may be characterized at different zoom levels. By way of example, density distributions of cells may be characterized at a comparatively high zoom level as well as density distributions of tissue portions at a comparatively low zoom level.

It has also been shown that the method and system conceived by the inventors can be applied in the field of cytology, in particular for evaluating Pap tests. Specifically the devised method and system can be advantageously used for assessing characteristics of cell clusters.

Figure 2:
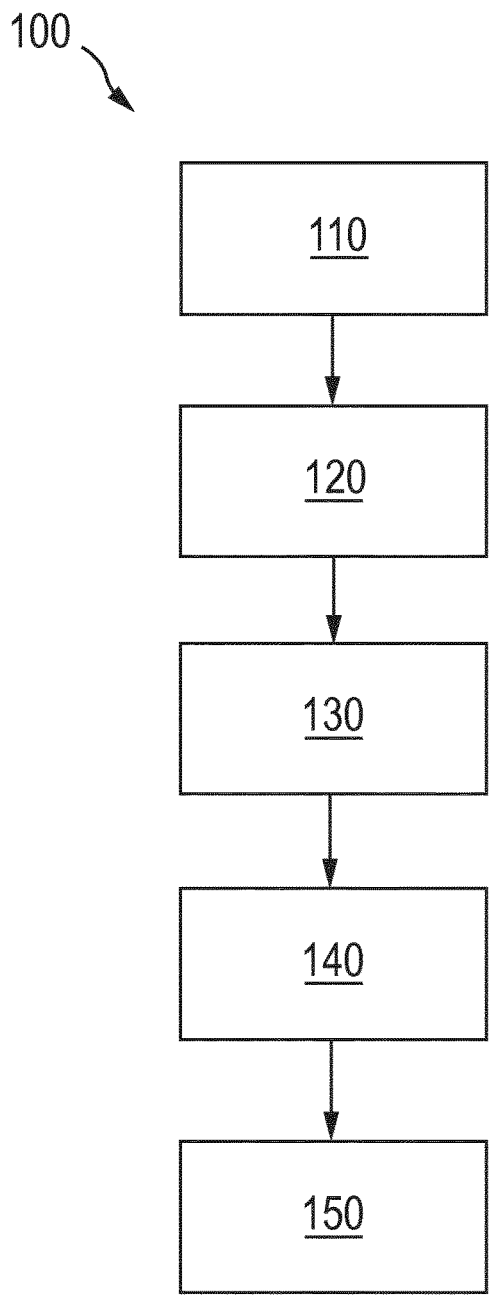
FIG. 2 is a flow chart of an exemplary method for analyzing tissue samples.

FIG. 2 illustrates a flow chart of an exemplary method 100 for analyzing tissue samples using a data processing system. The data processing system includes a processor which is configured to execute instructions to perform the exemplary method. One or more or all of the described steps may be performed automatically or interactively.

The data processing system reads 110 image data acquired from a tissue slice. The tissue slice may be obtained through biopsy or resection. The image data may be acquired using an image acquisition unit (designated with reference numeral 45 in FIG. 6), which may be whole slide scanner. A region of interest may be automatically or interactively determined depending on the acquired image data. It is also conceivable that other image acquisition techniques than microscopy and/or other microscopes may be used for acquiring the image data from the tissue slice.

The region of interest may represent a slice of a tumor microenvironment, i.e. a cellular environment, in which a tumor exists. The microenvironment may include one or a combination of vessels, immune cells, fibroblasts, lymphocytes and/or the extracellular matrix (ECM). It has been shown that the tumor and the surrounding microenvironment are closely related and interact with each other.

The data processing system then determines 120, depending on the image data, a plurality of vertices, each of which representing a location of an entity of interest within the region of interest. The plurality of vertices thereby form a two-dimensional point cloud. An entity of interest may include or may consist of: a cell, a cell nucleus, a group of cells (such as a cell cluster) or a tissue portion. The step of determining the vertices may be performed by the data processing system automatically or interactively. The interactive determination may be performed using a graphical user interface of the data processing system.

The determination of the vertices may include a segmentation of the entities of interest in the image data. The segmentation may be performed using image processing operations, such as edge detection. The segmentation may be performed using a neural network, such as a deep convolutional neural network.

For at least a portion of the segmented entities of interest, one or more morphological parameters of a morphology of the respective entity of interest may be determined. The one or more morphological parameters may be parameters of: an intensity of the acquired image data within the segmented entity of interest, a color appearance of the acquired image data (such as hue, colorfulness, chroma, saturation, lightness and/or brightness) within the segmented entity of interest, a texture of the image data within the segmented entity of interest and/or a shape of the segmented entity of interest. The shape parameters may include and/or may depend on: an area of the segmented entity of interest, an eccentricity of the segmented entity of interest (e.g. determined after the shape of the entity of interest has been approximated by an ellipse), a minimum diameter of the segmented entity of interest and/or or a maximum diameter of the segmented entity of interest.

Depending on the one or more morphological parameters, the entities of interest may be classified into one of a plurality of pre-defined classes of entities of interest. Examples of such classes are tumor cells, immune cells and stroma cells.

For each of at least a portion of the entities of interest, one of more vertices may be determined. Each of the vertices may represent a position of an entity of interest within the region of interest. The determination may be made depending on the classes which have been assigned to the entities of interest. By way of example, vertices may be generated only for a subset of the predefined classes. Thereby, for example, the vertices may represent a distribution of tumor cells within the region of interest.

Depending on the determined plurality of vertices, one or more graphs are generated 130. Generally, a graph is a structure amounting to a set of objects in which some pairs of the objects are in some sense "related". The objects correspond to mathematical abstractions called vertices (also called nodes or points) and each of the related pairs of vertices is called an edge (also called an arc or line). A graph may be depicted in diagrammatic form as a set of dots or circles for the vertices, joined by straight or curved lines for the edges.

In the exemplary method, each of the one or more generated graphs are generated based on the vertices which have been determined in step 120 and using an edge generation criterion, according to which edges are generated 130. The edge generation criteria of different graphs are different so that the graphs are different from each other although they are based on the same set of vertices. On the other hand, each of the edges within a graph are generated using the same edge generation criterion. Therefore, the edge generation criterion which is used for generating the graph's edges characterizes the graph.

Figure 3A:
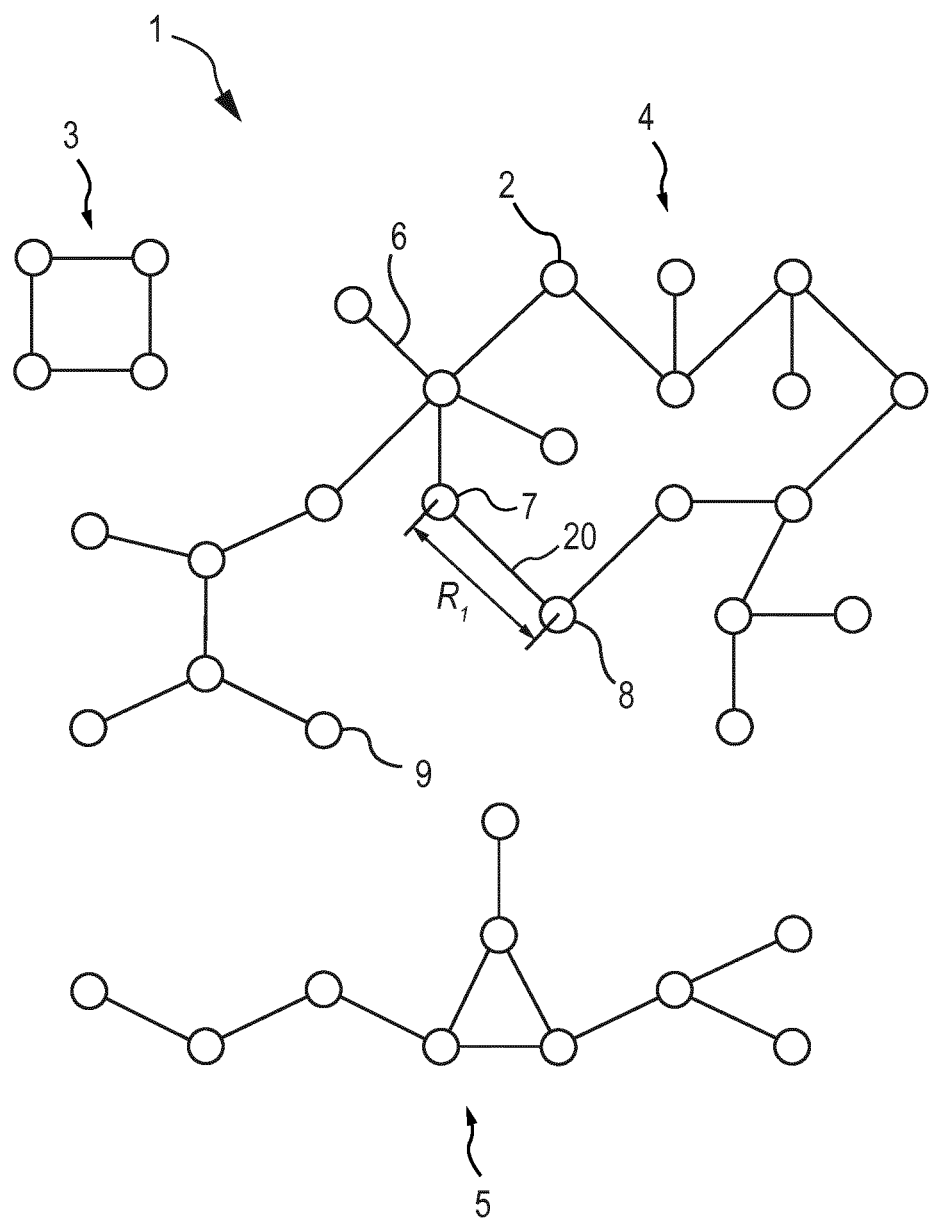
FIG. 3A is a first unit disk graph determined depending on a plurality of vertices which have been determined according to the exemplary method.

The step of generating 130 the graphs is described in more detail in the following with reference to FIGS. 3A and 3B. FIG. 3A illustrates a first graph 1, which is generated based on the vertices determined in step 120, such as the vertex 2 shown in FIG. 3A. The graph 1 includes a plurality of edges, such as the edge 6, wherein each of the edges connects a pair of the vertices. The edge generation criterion for graph 1 is as follows: for each pair of the vertices, an edge is generated for the respective pair if the Euclidean distance between the respective pair is shorter or equal than a predefined threshold value $R_1$. As is illustrated in FIG. 3A, the Euclidean distance between the vertices 7 and 8 is equal to $R_1$. Therefore, the data analysis system generates an edge for the pair of vertices 7 and 8. On the other hand, the Euclidean distance between the vertices 8 and 9 is greater than $R_1$. Therefore, no edge is generated for the pair of vertices 8 and 9.

Accordingly, the predefined threshold value $R_1$ represents a predefined threshold for generating the edges of the graph 1 and the edges of the graph 1 are generated by comparing a distance between a pair of vertices with the predefined threshold value $R_1$.

A graph, such as the graph 1 which is generated using the above-described edge generation criterion, is commonly referred to as a unit disk graph.

As can be seen from FIG. 3A, applying the above-described edge generation criterion to form graph 1 results in a plurality of isolated subgraphs 3, 4 and 5, which are mutually disconnected from each other. By way of example, with regards to subgraphs 3 and 4, there is no connection provided by the generated edges between any one of the vertices of subgraph 3 on the one hand and any one of the vertices of subgraph 4 on the other hand. In graph theory, such isolated subgraphs are usually denoted as "connected components".

As mentioned above, since the edge generation criteria of the graphs are different from each other, a plurality of different graphs are generated, each of which having the same vertices but a different arrangement of the edges. This is can be seen by comparing graph 1 of FIG. 3A with graph 33, which is shown in FIG. 3B and which is generated using a second edge generation criterion. The second edge generation criterion is as follows: for each pair of the vertices, which were determined in step 120, an edge is generated for the respective pair if the Euclidean distance between the respective pair is shorter or equal than a predetermined threshold value $R_2$. In the illustrated example, $R_2$ is smaller than $R_1$, which is used for generating the graph 1 shown in FIG. 3A. Therefore, in graph 2, which is shown in FIG. 3B, an edge 19 is generated for the pair of vertices 9 and 18 (having a distance equal to $R_2$), whereas no edge is generated for the pair of vertices 7 and 8 (for which the edge 20 was generated in graph 1 as can be seen from FIG. 3A).

Figure 3B:
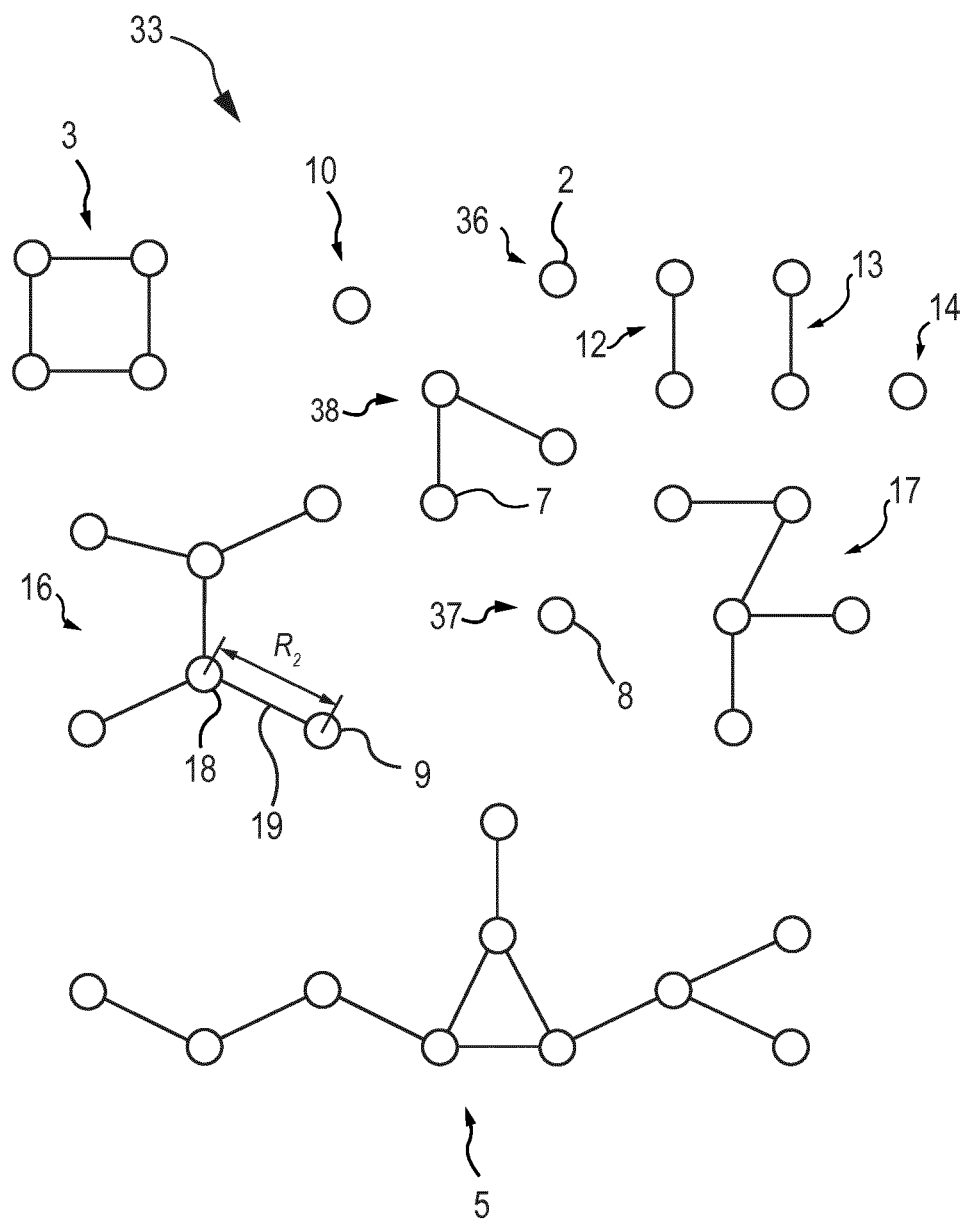
FIG. 3B is a second unit disk graph generated using the same vertices as used for generating the graph shown in FIG. 3A but using a different threshold for generating the graph's edges.

As can be seen from FIG. 3B, applying the above-described edge generation criterion to form graph 33 results in a plurality of isolated subgraphs 3, 5, 10, 12, 13, 14, 16, 17, 36, 37, 38, which are mutually disconnected from each other. As can further be seen by comparing the graph 1 (shown in FIG. 3A) with graph 33 (shown in FIG. 3B), the different edge generation criteria applied for generating the graphs lead to a different number of isolated subgraphs.

As can further be seen from FIGS. 3A and 3B, each of the isolated subgraphs corresponds to a vertex set so that each graph includes one or more vertex sets. The number of vertex sets are different for the graphs 1 and 33. The inventors have found that the number of vertex sets can advantageously be used for evaluating the region of interest, in particular for comparing different regions of interest. Accordingly, the exemplary method 100 (shown in FIG. 2) includes identification 140 of the vertex sets and determination 150 for each of the graphs (i.e. for each of the edge generating criteria) a number of the generated isolated subgraphs (i.e. vertex sets). These steps may be performed by the data processing system automatically or interactively.

The interactive operations may, for example, be performed using a graphical user interface of the data processing system.

It is noted that the invention is not limited to unit disk graphs, as shown in FIGS. 3A and 3B. In an alternative exemplary method, the graphs are determined using Voronoi diagrams, as is discussed below with reference to FIGS. 4A and 4B.

Figure 4A:
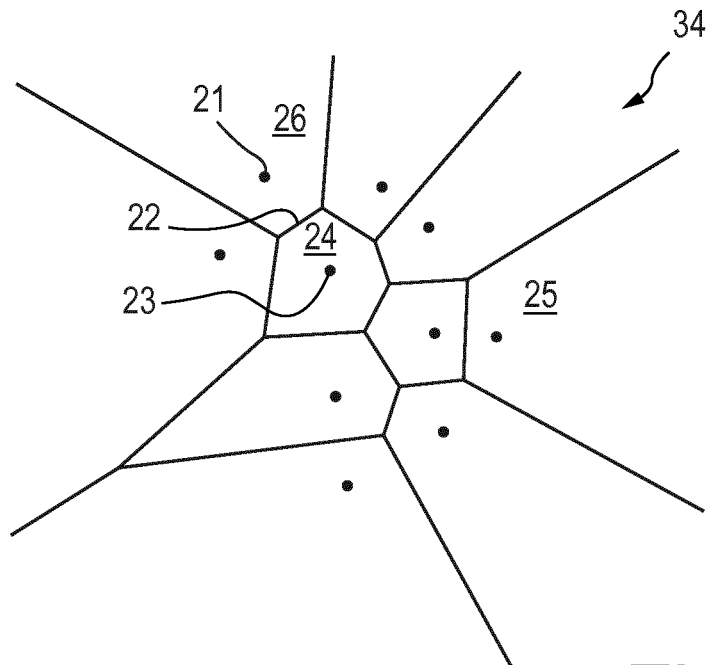
FIGS. 4A and 4B schematically illustrate generation of a graph according to an alternative exemplary method, wherein a Voronoi diagram is generated based on vertices determined depending on image data.

FIG. 4A illustrates a Voronoi diagram 34 which has been determined based on a plurality of vertices (such as vertex 21) which are represented in FIG. 4A by dots. The Voronoi diagram 34 includes exactly one Voronoi region for each of the vertices (such as the Voronoi regions 24 and 26 for the vertices 21 and 23). Generally, a Voronoi diagram 34 is specified by a given set of vertices in a plane. Boundaries between adjacent Voronoi regions, like the boundary 22 between Voronoi regions 24 and 26, are each constituted by a straight line segment. Each point on the boundary (such as the boundary 22) has an equal distance to each of the vertices (vertices 21 and 23) of the adjacent Voronoi regions (Voronoi regions 24 and 26). In other words, for each vertex, there is a corresponding Voronoi region which consists of all points closer to that vertex than to any other vertex.

Figure 4B:
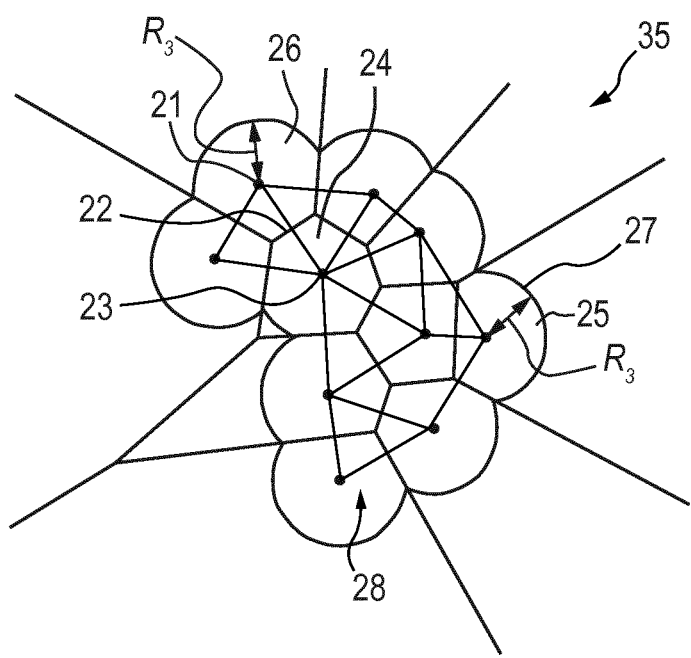

As can be seen in FIG. 4A, there are Voronoi regions, like the region 25, which have an unlimited extend. Further, the Voronoi region can be comparatively large if vertices of neighboring Voronoi regions are separated by a large distance. As is illustrated in FIG. 4B, in the alternative exemplary method, the Voronoi diagram is modified so that each Voronoi region has a maximum predefined radius $R_3$, measured from the region's vertex. The Voronoi diagram of FIG. 4B is therefore a radius-bounded Voronoi diagram 35 in which each of the Voronoi regions is spatially bounded by a same maximum radius $R_3$. Thereby, for each of the regions, the respective boundary is composed of segments of straight lines (defining direct neighbors of Voronoi regions) and/or circular arcs (such as the arc 27) having a radius of curvature of $R_3$.

The radius-bounded Voronoi diagram 35 allows modelling of structures that much better mimic true cell tissue. The reason for this resides in the fact that pathology images may include areas, where no cell is present. Such area may relate to cavities which are filled with fluids, empty cavities, fat tissue, etc. Whenever such areas are large, it is unrealistic to assume that cells on opposite sides of this area are direct neighbors.

Based on the radius-bounded Voronoi diagram 35 shown in FIG. 4B, in the alternative exemplary method, a graph is constructed by connecting vertices of neighboring Voronoi regions. This results in the graph 28 shown in FIG. 4B. The maximum radius $R_3$ provides a threshold for generating the graph's edges. If two vertices are spaced apart by a distance which is larger than two times the maximum radius $R_3$, the corresponding Voronoi regions cannot be neighboring regions and thereby are note connected with each other by an edge.

Compared to unit disk graphs (like the graphs shown in FIGS. 3A and 3B), in graphs which are generated using Voronoi diagrams, it is avoided that two vertices are neighbors if there are one or more further vertices located in between them.

In the same way as has been described above in connection with the unit disk graphs shown in FIGS. 3A and 3B, also the graph according to the alternative exemplary embodiment, which is generated using a radius-bounded Voronoi diagram, may result in one or more isolated subgraphs, which are mutually disconnected from each other.

Also for the alternative exemplary embodiment, the data processing system is configured to determine 150 the number of vertex sets, i.e. the number of isolated subgraphs for the graph. A plurality of graphs may be generated, each of which relating to a different maximum radius used to determine the radius-bounded Voronoi diagram.

As is demonstrated by the graphs shown in FIGS. 3A, 3B and 4B, each of the graphs is composed of edges having a length equal to or less than a maximum length, which is characteristic of the respective graph. The maximum length is measured using the Euclidean metric. However, it is also conceivable that the graph is defined using other metrics than the Euclidean metric.

As is described in detail below in connection with FIGS. 5A and 5B, depending on the determined number of isolated subgraphs, the data processing system is configured to classify and/or rate the regions of interest. The determined rating and/or classification may be used for a diagnosis and/or for a prognosis.

Figure 5A:
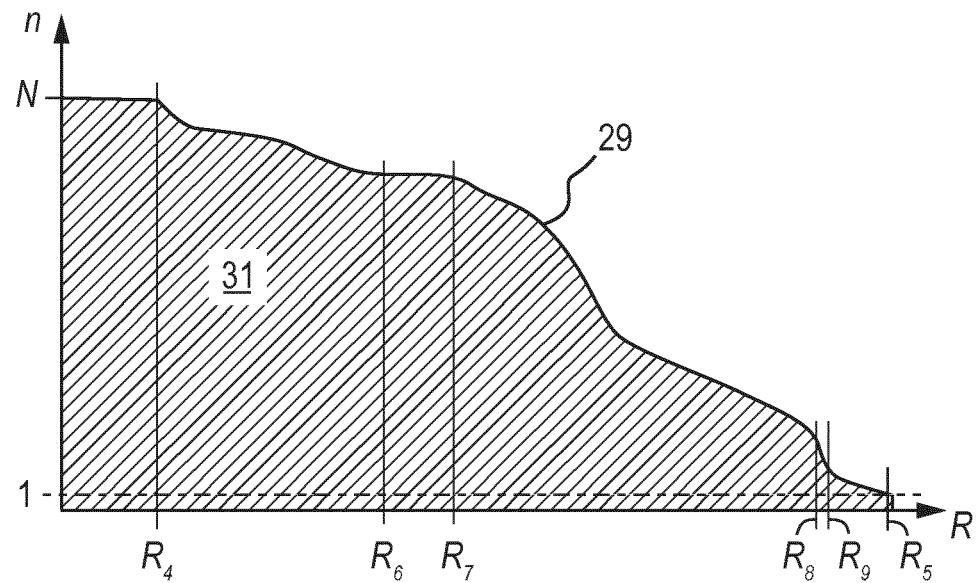
FIGS. 5A and 5B are schematic illustrations of different metrics which are calculated from the dependency of the number of isolated subgraphs, which were determined based on the same set of vertices, vs. the threshold used for generating the edges of the respective graph.

FIG. 5A illustrates a curve 29 showing, for each of a plurality of graphs, the number of isolated subgraphs (designated as n in FIG. 5A) vs. the threshold value (designated as R in FIG. 5A) used for generating the edges of the respective graph, wherein each of the graphs have the same vertices (as determined in step 110 shown in FIG. 2). The curve 29 therefore corresponds to a set of vertices determined from the image data of a region of interest and to a plurality of different graphs which were determined depending on this set of vertices.

As can be seen in FIG. 5A, for threshold values, which are less than the shortest distance $R_4$ of all distances between pairs of the vertices, the number of isolated subgraphs amounts to N, which is the number of vertices contained in the region of interest. On the other hand, for threshold values R, which are equal to or greater than the largest distance $R_5$ of all distances between pairs of the vertices, the graph is fully connected so that the number of isolated subgraphs is exactly 1.

The inventors have shown that the shape of the curve 29 can be analyzed to obtain a classification and/or a rating for the region of interest. The classification and/or rating may be used for a diagnosis and/or for a prognosis. The inventors have further shown that parameter values calculated from the shape of the curve 29 can be used to compare different regions of interest.

By way of example, the inventors have found that the integral of the curve 29 over an interval of threshold values, such as the interval from 0 to $R_5$ yields a value, which relates to the degree to which the entities of interest (such as the cells) are arranged in clusters. A high degree of clustering represents a high degree of fragmentation of the tissue. The integral from 0 to $R_5$ corresponds to the hatched area 31 shown in FIG. 5A.

Specifically, a comparatively high integral value indicates that the entities of interest are comparatively homogeneously distributed over the region of interest, whereas a low integral value indicates a comparatively high degree of clustering. This allows comparison of the degree of clustering or the degree of fragmentation between different regions of interest.

Figure 5B:
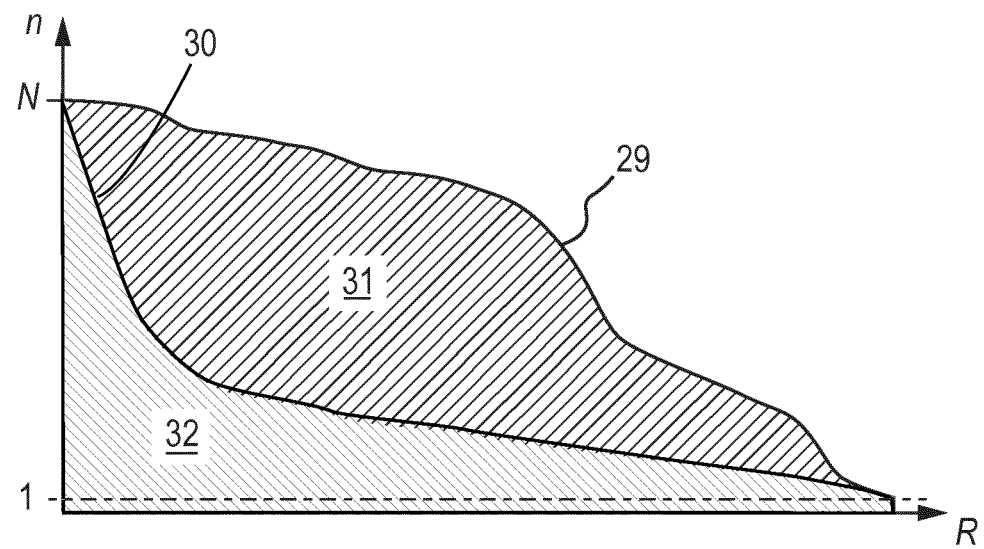

Such a comparison is illustrated in FIG. 5B which shows, in addition to the curve 29, a second curve 30 which relates to a second region of interest, i.e. a second set of vertices determined from the same or from a different tissue sample. Compared to the first curve 29, the second curve 30 shows a much steeper decline at small threshold values R than curve 29. The steeper decline at small threshold values R results in a lower integral value, since, by definition, the curve representing the number of isolated subgraphs must be monotonically decreasing with increasing threshold values.

The slope of the curve indicates the rate at which fragmentation of the tissue changes as the threshold value R is increased. As is shown in FIG. 5A, in the curve 29, the number of isolated subgraphs for threshold values between $R_6$ and $R_7$ is substantially constant, thereby forming a plateau. At the threshold value of $R_7$, the curve 29 starts to decline further with increasing threshold values R. This indicates the presence of multiple, isolated high-density areas or clusters in the region of interest, which are separated from each other by a minimum distance of substantially $R_7$. Therefore, the minimum separation distance between the high density areas or clusters of the entities of interest can be determined using a difference between numbers of isolated subgraphs at different threshold values. By way of example, the difference can be used to identify plateaus and/or to determine a value of a slope.

As can further be seen in FIG. 5A, the curve 29 shows a region of steep decline between threshold values $R_8$ and $R_9$ which is preceded by a region of a comparatively shallow decline. This indicates a further level of fragmentation or cluster formation at higher threshold values. As such, the exemplary method allows analysis of the image data, in particular analysis of clusters formation and/or tissue fragmentation, at different zoom levels.

The parameter values, which have been derived from the image data of different regions of interest according to the methods described herein, can be used to generate a heat map of a portion or even of the whole tissue slice. Therefore, the heat map is a graphical representation which may be displayed concurrently, in particular in an overlaid fashion with at least a portion of the microscopic image data. Examples of these parameters are the sum of the determined number of identified vertex sets over all or over a portion of the generated graphs (such as the integral over the curve 29 shown in FIGS. 5A and 5B over an interval of the threshold values); and/or a difference between two of the determined numbers of identified vertex sets of different graphs (such as a slope of the curve 29).

Additionally or alternatively, the data processing system may be configured to classify and/or to rate at least one tissue portion contained in the region of interest, a cell contained in the region of interest, a group of cells contained in the region of interest and/or the region of interest. The data processing system may be configured to generate a heat map depending on and/or indicative of the classification and/or the rating. Therefore, the heat map is a graphical representation which may be displayed concurrently, in particular in an overlaid fashion with at least a portion of the microscopic image data.

By way of example, the intensity values of the intensity map correspond to a same threshold value. Additionally or alternatively, the parameter values, can also be used to compare different samples taken from the same or from different patients. In this way, for example, a statement about the heterogeneity of a lesion or the heterogeneity between different lesions can be made.

In a method according to a further exemplary embodiment of the method, in the step 120, shown in FIG. 2, the vertices are determined so that each edge is associated with a pair of vertices (i.e. the edge connects the pair of vertices) consisting of different classes of entities of interest. It has been shown that this allows studying the proximity of selected cell or tissue types that are expected to have a biological interaction.

By way of example, the edges may be generated so that each edge is associated with a pair consisting of an immune cell and a tumor cell. An example for such a biological interaction which can be studied using this exemplary embodiment is the interaction between cytotoxic T cells and tumor cells. By way of example, a heat map may be generated for the tissue slice, which shows, for each location, the number of isolated subgraphs for a threshold value which corresponds to a predetermined maximum interaction distance between the two classes of cells. Thereby, locations on the tissue slide may be identified, where a high degree of interaction between the cells of the cell classes is present.

It is further conceivable that for determining the vertices, a classifier is used that distinguishes between different cell classes and/or different tissue classes. This allows, for each of the entities of interest, a classification of the context of the respective entity of interest by the data processing system. By way of example, the data processing system may be configured to classify the context of each cell and/or to classify the context of cells of a particular class. The data processing system may then generate a graph consisting of entities of interest, all of which having a same context class.

The data processing system may include a display device and may be configured to present to the user at least a portion of the region of interest and/or one or more graphical representations determined depending on the graph, depending on one or more of the vertex sets and/or depending on the number of identified vertex sets. The display device may include a flat panel display. At least a portion of the graphical representations may be overlaid on the displayed portion of the region of interest.

The displayed graphical representation may be, for example, a graphical representation of a graph (i.e. by displaying vertices and edges, such as shown in FIG. 3A, 3B, 4A or 4B) and/or a graphical representation of one or more of the determined vertex sets. The graphical representation of a vertex set may show the positions of the vertices of the vertex set or the positions of the vertices of different vertex sets, wherein the graphical representation indicates which vertices are members of a same vertex set. Additionally or alternatively a graphical representation of a curve may be displayed, showing the number of vertex sets (i.e. the number of isolated subgraphs) vs. the threshold value (such as shown in FIG. 5A). The graphical representation may relate to at least the portion of the region of interest which is displayed by the display device. This allows the user to compare the graphical representation with the region of interest.

The data processing system may further be configured to receive user input for selecting the portion of the region of interest displayed to the user. By way of example, the user input may be indicative of a zoom level and/or indicative of a position of the field of view within the image data. The data processing system may further be configured to update, in response to the user input for selecting the field of view, the one or more graphical representations displayed to the user depending on the user input. The updating may be performed in a time relationship, in particular in real-time, with the user input for selecting the region of interest. This allows the user to browse the image data in an efficient manner to identify fields of view which are of interest for later analysis.

The determining of the vertices (step 120 in FIG. 2) and/or the generation of the edges of the graph (step 130 in FIG. 2) may be performed interactively (i.e. requiring user intervention via the user interface). The data processing system may be configured to present to the user, using a display device of the data processing system, at least a portion of the region of interest. The data processing system may be configured to receive user input indicative of one or more parameters which are used by the data processing system to determine the plurality of vertices, to generate the edges of the graph and/or to identify the vertex sets. By way of example, the data processing system may receive user input indicative of a threshold value. The data processing system may determine, for one or more pairs of the vertices, whether or not to generate an edge which is associated with the pair of vertices, depending on the threshold.

Additionally or alternatively, the data processing system may be configured to receive user input for performing a segmentation of the region of interest to perform the determination of the vertices (step 120 in FIG. 2). By way of example, the user input may represent one or more parameters of an edge detection filter.

In view of the foregoing, a method and a system is provided which allow efficient and reliable analysis of tissue samples and which enhance diagnosis and prognosis. The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In particular, although the invention has been described based on a projection radiograph, it can be applied to any imaging technique which results in a projection image. In the claims, the word "comprising" does not exclude other elements or steps, and the indefinite article "a" or "an" does not exclude a plurality. Any reference signs in the claims should not be construed as limiting the scope.

The invention claimed is:

1. A system for analysis of microscopic image data acquired from biological cells, the system comprising a processor to:
   read the image data;
   determine a plurality of vertices, wherein each of the vertices represents a location of an entity of interest within a region of interest of the image data;
   generate a plurality of graphs, wherein for each of the graphs, the generation of the respective graph comprises generating a plurality of edges, wherein each of the edges has two of the plurality of vertices associated therewith;
   wherein for each of the graphs, the generating of the respective graph comprises:
   determining for a pair of the vertices whether to generate an edge associated with the pair depending on whether a distance between the vertices of the pair according to a predefined metric is smaller than a threshold ($R_1$, $R_2$) which is predefined for the respective graph;
   wherein the predefined thresholds ($R_1$, $R_2$) of the graphs are different from each other;
   wherein each of the graphs comprises the plurality of edges generated for the respective graph and the plurality of vertices;
   identify, for each of the graphs and depending on the edges generated for the respective graph, one or more vertex sets, each of which comprising one or more of the plurality of vertices; and to
   generate, for each of the graphs, a number of the identified vertex sets;
   determine a difference between two of the determined numbers of identified vertex sets of different graphs; and to
   classify and/or to rate at least one tissue portion contained in the region of interest, a cell contained in the region of interest, a group of cells contained in the region of interest and/or the region of interest depending on the determined difference.

2. The system of claim 1, wherein the processor is further configured to determine a sum of the determined numbers of identified vertex sets over all or over a portion of the generated graphs.

3. The system of claim 2, wherein the processor is further configured to classify and/or to rate at least one tissue portion contained in the region of interest, a cell contained in the region of interest, a group of cells contained in the region of interest and/or the region of interest depending on the determined sum.

4. The system of claim 1, wherein the generation of the graphs comprises: generating a Voronoi diagram depending on the vertices; wherein the Voronoi diagram comprises exactly one Voronoi region for each of the vertices; and wherein each of the graphs is generated based on the Voronoi diagram.

5. The system of claim 4, wherein each of the graphs is constructed from a respective radius-bounded Voronoi diagram, in which each of the Voronoi regions is spatially bounded by a same maximum Radius (R3); wherein each of the graphs has a different maximum Radius (R3).

6. The system of claim 1, wherein the processor is further configured to classify and/or to rate at least one tissue portion contained in the region of interest, a cell contained in the region of interest, a group of cells contained in the region of interest and/or the region of interest depending on the determined numbers of generated vertex sets.

7. The system of claim 1, wherein for each of the graphs, the generation of the plurality of edges comprises: determining for each pair of the vertices, whether or not to generate an edge.

8. The system of claim 1 wherein for each of the graphs:
   a) each of the identified vertex sets consists of one vertex or more vertices so that each pair thereof is connected by one or more of the edges of the graph; and
   b) the identified vertex sets are mutually unconnected by the edges of the graph.

9. The system of claim 1, wherein the system comprises an scanner to: receive a sample, which comprises the cells; and to image the cells.

10. A method of analyzing microscopic data acquired from biological cells, wherein the analysis is performed using a processor, the method comprising:
    reading using the processor, the image data;
    determining using the processor, a plurality of vertices, wherein each of the vertices represents a location of an entity of interest within a region of interest of the image data;
    generating, using the processor, a plurality of graphs, wherein for each of the graphs, the generation of the respective graph comprises generating a plurality of edges, wherein each of the edges has two of the plurality of vertices associated therewith;
    wherein for each of the graphs, the generating of the respective graph comprises:
    determining for a pair of the vertices whether to generate an edge associated with the pair depending on whether a distance between the vertices of the pair according to a predefined metric is smaller than a threshold ($R_1$, $R_2$) which is predefined for the respective graph;

wherein the predefined thresholds ($R_1$, $R_2$) of the graphs are different from each other;

wherein each of the graphs comprises the plurality of edges generated for the respective graph and the plurality of vertices;

identifying, using the processor, for each of the graphs and depending on the edges generated for the respective graph, one or more vertex sets, each of which comprising one or more of the plurality of vertices; and generating, using the processor, for each of the graphs, a number of the identified vertex sets;

determining, using the processor, a difference between two of the determined numbers of identified vertex sets of different graphs; and classifying and/or rating, using the processor, at least one tissue portion contained in the region of interest, a cell contained in the region of interest, a group of cells contained in the region of interest and/or the region of interest depending on the determined difference.

11. A non-transitory computer readable medium having stored thereon a program for analyzing microscopic data acquired from biological cells, wherein the program, when being executed by a processor causes the processor to carry out:

reading the image data;

determining a plurality of vertices, wherein each of the vertices in the plurality represents a location of an entity of interest within a region of interest of the image data;

generating, using the processor, a plurality of graphs, wherein the generation of the respective graphs comprises generating a plurality of edges, wherein each of the edges has two of the plurality of vertices associated therewith;

wherein for each of the graphs, the generating of the respective graph comprises:

determining for a pair of the vertices whether to generate an edge associated with the pair depending on whether a distance between the vertices of the pair according to a predefined metric is smaller than a threshold ($R_1$, $R_2$) which is predefined for the respective graph wherein the predefined thresholds ($R_1$, $R_2$) of the graphs are different from each other;

wherein each of the graphs comprises the plurality of edges generated for the respective graph and the plurality of vertices;

identifying, for each of the graphs and depending on the edges generated for the respective graph, one or more vertex sets, each of which comprising one or more of the plurality of vertices; and generating, for each of the graphs, a number of the identified vertex sets;

determining a difference between two of the determined numbers of identified vertex sets of different graphs; and classifying and/or rating at least one tissue portion contained in the region of interest, a cell contained in the region of interest, a group of cells contained in the region of interest and/or the region of interest depending on the determined difference.

\* \* \* \* \*